(12) United States Patent
Margosian

(10) Patent No.: US 12,009,944 B2
(45) Date of Patent: *Jun. 11, 2024

(54) SYSTEMS AND METHODS FOR OBTAINING DATA FROM MULTIPLE INTERNAL VEHICLE NETWORKS

(71) Applicant: ARGO AI, LLC, Pittsburgh, PA (US)

(72) Inventor: Brian T. Margosian, Lathrup Village, MI (US)

(73) Assignee: ARGO AI, LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/342,229

(22) Filed: Jun. 27, 2023

(65) Prior Publication Data

US 2023/0344674 A1    Oct. 26, 2023

Related U.S. Application Data

(63) Continuation of application No. 17/092,936, filed on Nov. 9, 2020, now Pat. No. 11,743,074.

(51) Int. Cl.
*H04L 12/40* (2006.01)

(52) U.S. Cl.
CPC ........ *H04L 12/40143* (2013.01); *H04L 12/40* (2013.01); *H04L 2012/40215* (2013.01); *H04L 2012/40273* (2013.01)

(58) Field of Classification Search
CPC ............... H04L 12/40143; H04L 12/40; H04L 2012/40216; H04L 2012/40273
See application file for complete search history.

(56) References Cited

U.S. PATENT DOCUMENTS

| 10,124,779 | B2 | 11/2018 | Lin et al. |
| 10,291,687 | B2 | 5/2019 | Nakamura |

(Continued)

FOREIGN PATENT DOCUMENTS

| KR | 10-0696889 B1 | 3/2007 |
| KR | 10-0946991 B1 | 3/2010 |

OTHER PUBLICATIONS

International Search Report and Written Opinion of the International Searching Authority directed to related International Patent Application No. PCT/US2021/058450, dated Feb. 23, 2022; 9 pages.

(Continued)

*Primary Examiner* — Walter J Divito
*Assistant Examiner* — Anthony Luo
(74) *Attorney, Agent, or Firm* — Sterne, Kessler, Goldstein & Fox P.L.L.C.

(57) ABSTRACT

Systems, methods, and computer-readable media are disclosed for obtaining data from multiple internal vehicle networks. An example method may include receiving, using a first internal communication network of a vehicle, a first query for data from one or more devices of the vehicle, wherein the first query is formatted for communication over the first internal communication network. The example method may also include generating, based on the first query, a second query associated with a supplemental communication network, wherein the supplemental communication network is also internal to the vehicle. The example method may also include sending, using the supplemental communication network, the second query to a first device, the first device being located on the supplemental communication network. The example method may also include receiving, from the first device, data relating to the second query. The example method may also include sending, using (Continued)

the first internal communication network of the vehicle, the data relating to the second query.

20 Claims, 3 Drawing Sheets

(56) References Cited

U.S. PATENT DOCUMENTS

| | | |
|---|---|---|
| 10,797,909 B2 | 10/2020 | Kolbus et al. |
| 2008/0186870 A1 | 8/2008 | Butts et al. |
| 2015/0071115 A1 | 3/2015 | Neff et al. |
| 2015/0131477 A1 | 5/2015 | Balbierer et al. |
| 2016/0140776 A1 | 5/2016 | Ricci |
| 2016/0182341 A1 | 6/2016 | Fischer et al. |
| 2017/0195341 A1 | 7/2017 | Metz et al. |
| 2017/0197505 A1* | 7/2017 | Ferguson ............... B60K 23/08 |
| 2018/0196434 A1 | 7/2018 | Hartung et al. |
| 2019/0043201 A1 | 2/2019 | Strong et al. |
| 2019/0312892 A1 | 10/2019 | Chung et al. |
| 2019/0379682 A1 | 12/2019 | Overby et al. |
| 2021/0099854 A1* | 4/2021 | Tran ...................... H04W 8/005 |
| 2021/0194724 A1 | 6/2021 | Lee |
| 2022/0150090 A1 | 5/2022 | Margosian |

OTHER PUBLICATIONS

Jeong et al., "An Integrated Self-Diagnosis System for an Autonomous Vehicle Based on an IoT Gateway and Deep Learning", *Applied Sciences,* Jul. 18, 2018, pp. 1-24, vol. 8, MDPI, Basel, Switzerland.

Jeong et al., "The Lightweight Autonomous Vehicle Self-Diagnosis (LAVS) Using Machine Learning Based on Sensors and Multi-Protocol IoT Gateway", *Sensors,* Jun. 3, 2019, pp. 1-24, vol. 19, MDPI, Basel, Switzerland.

Levi, Z., "Automotive Ethernet: The Future of In-Car Networking?" *Electronic Design,* Apr. 4, 2018, Electronic Design, Nashville, TN.

* cited by examiner

SYSTEMS AND METHODS FOR OBTAINING DATA FROM MULTIPLE INTERNAL VEHICLE NETWORKS

RELATED APPLICATION

This application is a continuation of U.S. patent application Ser. No. 17/092,936, filed Nov. 9, 2020, which is incorporated herein by reference in its entirety.

BACKGROUND

In some vehicles, one or more Controller Area Network (CAN) buses may be used to allow certain devices within the vehicle to communicate with one another. Diagnostic tools (for example, portable On-board Diagnostic (OBD)-II devices) may be configured to interface with the vehicle CAN bus to obtain data from the devices in communication with the CAN bus. This may be beneficial for various reasons, such as performing diagnostics when problems arise with the vehicle, obtaining status information from the various devices within the vehicle, or simply obtaining data being captured by any of the devices within the vehicle (for example, a user may desire to view data from a certain Mass Airflow Sensor (MAF) of the vehicle, or any other type of vehicle sensor). However, some vehicles may also include various other types of communication networks beyond only a CAN bus. For example, some vehicles may also include an Ethernet network for certain vehicle devices to use to perform faster, higher bandwidth data transmissions. Given this, more than one diagnostic tool may be required to obtain data from devices within vehicles that include a combination of different types of communication networks (or one device may be required to be incorporated directly into the Ethernet network for diagnostics). This may be because diagnostic tools that are configured to obtain data from the vehicle over the CAN bus may not necessarily also be configured to obtain data from Ethernet-based devices as well.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
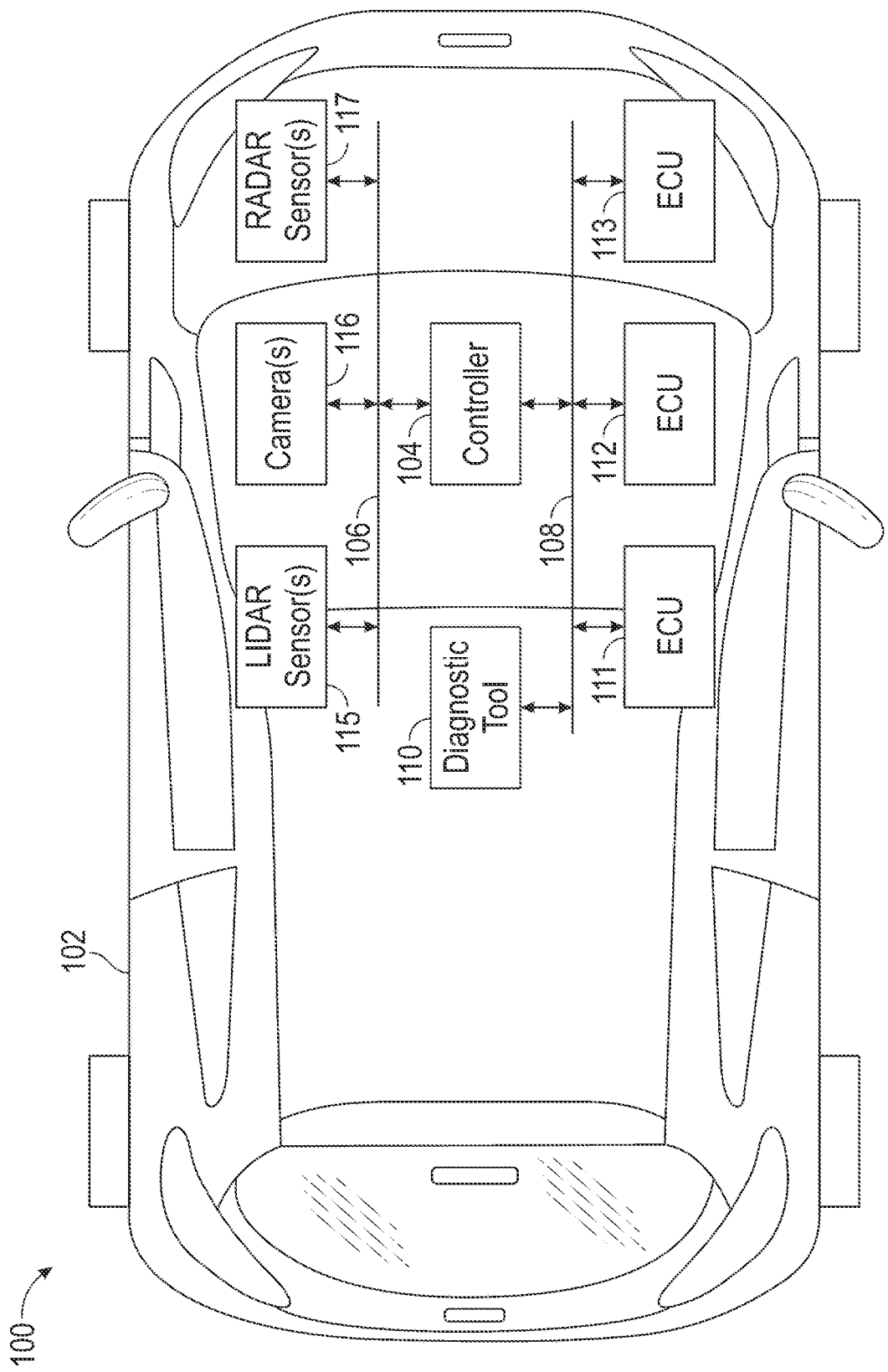
FIG. 1 depicts a schematic illustration of an example system architecture, in accordance with one or more example embodiments of the disclosure.

This disclosure relates to, among other things, systems and methods for obtaining data from multiple internal vehicle networks. More particularly, the systems and methods may pertain to obtaining diagnostics data from different types of communications networks internal to a vehicle that may be used by devices of the vehicle to communicate with one another. For example, vehicles may often include one or more CAN buses through which various vehicle devices may communicate. Some vehicles may further include other types of networks in addition to CAN buses, such as Ethernet networks. Ethernet networks may be used for certain vehicle devices to perform faster, higher bandwidth data transmissions. For example, vehicle devices that may be associated with semi-autonomous or autonomous vehicle functionality may transmit large amounts of data that is captured in real-time, and thus the Ethernet network may be more favorable for communications involving these types of devices. However, in some cases, obtaining diagnostics data from vehicles that includes multiple of these types of communications network may be more difficult. This may be because diagnostics tools may only be configured to communicate with one of the types of vehicle networks. For example, OBD (or OBD-II) devices may be configured to interface with a vehicle's CAN bus to obtain data from devices that may communicate over the CAN bus of the vehicle, but may not be configured to interface with an Ethernet network. Consequentially, a user may be required to use two (or more) separate tools for obtaining data associated with both the devices on the CAN bus and the devices on the Ethernet network.

In some embodiments, the systems and methods described herein may remedy these problems that may arise in obtaining diagnostics in vehicles with multiple types of communication networks by including an intermediary device within the vehicle (for example, the controller 104 described with respect to FIG. 1 or any other controller described herein) that may serve as an intermediary between the CAN bus on which the diagnostic tool may communicate and the Ethernet network. That is, the intermediary device my receive a request for diagnostics data from the diagnostics tool over the CAN bus and may either convert the request into a format suitable for transmission over the Ethernet network, or may recognize based on the request one or more devices on the Ethernet network to obtain data from to provide to the diagnostics tool over the CAN bus. Additional details regarding the operations performed by the intermediary device in serving as an interface between the CAN bus and the Ethernet network may be described below with respect to at least FIG. 2, as well as any other figures described herein). It should be noted that while it is described herein that the diagnostic tool is connected to a CAN bus and the second communication network in the vehicle is an Ethernet network, the vehicle may include any other types and/or combinations of types of communication networks, and the diagnostics tool may similarly interface with any of these types of communication networks as well. Additionally, while the terms "diagnostics" or "diagnostics data" may be used herein, any other types of data may be obtained using the systems and methods described herein as well.

In some embodiments, the systems and methods described herein may have a number of benefits. An example benefit may be that diagnostics data may be obtained from any number of devices included within any number of different types of vehicle networks using only a single diagnostics tool, even if the different types of vehicle networks are associated with different communication protocols. This may be beneficial for a number of different applications, such as logging metrics relating to sensors on different communication networks in a vehicle or taking a "snapshot" of some or all of the sensor data at a given time or over a given time period. That is, data may be pulled from multiple different types of sensors communicating over multiple different types of communication networks in a vehicle using a single diagnostics tool (for example, sensor data for sensors located in different communication networks can be pulled using only an OBD device in communication with a CAN bus of the vehicle).

Turning to the figures, FIG. 1 depicts a schematic illustration of an example system 100, in accordance with one or more example embodiments of the disclosure. The system 100 is depicted in FIG. 1 as being implemented in a vehicle 102, however, the system 100 may be implemented in other contexts as well. The system 100 may include a controller 104 that may be in communication with an Ethernet network 106 and a CAN bus 108 (the Ethernet network 106 and CAN bus 108 may be collectively referred to as "communication networks" of the vehicle 102 herein. Additionally, each of the Ethernet network 106 and CAN bus 108 individual may be referred to as a single "communication network."). The system 100 may also include a diagnostics tool 110 that may be in communication with the controller 102 over the CAN bus 108. It should be noted that while the system 100 may be depicted as being in communication with an Ethernet network 106 and a CAN bus 108, the Ethernet network 106 and a CAN bus 108 may similarly be replaced with any other two (or more) types of communication networks that may be implemented in a vehicle (for example, vehicle networks such as FlexRay, Local Interconnected Network (LIN), K-Line, or any other type of network through which devices may communicate, such as Wi-Fi or cellular networks, as a few non-limiting examples).

In some embodiments, the CAN bus 108 may be a network internal to the vehicle 102 that may allow various devices and microcontrollers within the vehicle 102 to be connected and to communicate using a standardized CAN protocol (which may be defined in the CAN specification (ISO 11898)). For example, the CAN bus 108 may be used to transfer data between one or more Electronic Control Units (ECUs) of the vehicle 102, such as ECU 111, ECU 112, ECU 113, and/or any other number of ECUs that may be included within a vehicle. An ECU may be a computing element within the vehicle 102 that may be responsible for managing operations of one or more particular features of the vehicle 102. For example, one ECU may control and monitor various accessories in a door of the vehicle 102. A second ECU may control features like automatic mirror adjustment. A third ECU may provide engine management functionality. The CAN bus 108 may also be used to transmit data between any other types of devices other than ECUs as well. Additionally, some vehicles and systems implementing CAN may use both a high-speed and a low-speed CAN bus in parallel. The high-speed CAN bus may carry information that is useful for vehicle operation and may be delivered to various parts of the vehicle 102 or system in real-time. For example, the high-speed CAN bus may be used in a situation where an airbag deploys. When sensors in the bumper or at the front of the vehicle 102 indicate that the vehicle has been involved in a frontal collision, the sensors can send priority information via the high-speed CAN bus to the airbag deployment unit to deploy the airbag. The low-speed CAN bus may be used for applications that may not require as quick of a response time.

In some embodiments, the vehicle 102 may also include an Ethernet network 106. The Ethernet network 106 may be used alternatively to, or in conjunction with, the CAN bus 108 to transfer data between components within the vehicle 102. Ethernet may specifically be used to transport a variety of high-speed data. Like the CAN bus 108, the Ethernet network 106 may be a packetized system, where information is transferred in packets between nodes on various parts of the Ethernet network 106. Also like the CAN bus 108, the Ethernet network 106 may be bidirectional, and the speed possible on any individual link may decreases as the number of nodes within the network increases. Regardless, Ethernet may be able to transport data at a much faster rate than the CAN bus 108 (for example, up to 100 times faster or more). Thus, the Ethernet network 106 can be used in much the same way as a CAN bus 108 while providing much more bandwidth. This may make the Ethernet network 106 beneficial to use for certain types of sensors and/or computing components within the vehicle 102, such as sensors and/or computing elements associated with autonomous or semi-autonomous vehicle functionality. As depicted in the figure, for example, LIDAR sensor(s) 115, camera(s) 116, and/or radar sensor(s) 117 may transfer data using the Ethernet network 106 because these types of sensors may capture large amounts of data that may be processed by the vehicle 102 in real-time.

In some embodiments, diagnostics tool 110 may be a device that is configured to obtain data from the various devices communicating over the networks of the vehicle 102. In some cases, the diagnostics tool 110 may only be configured to communicate over one particular type of communication network of the vehicle 102. For example, the diagnostics tool 110 may be configured to communicate over the CAN bus 108 of the vehicle 102. In some cases, the diagnostics tool 110 may more specifically be a portable OBD device that may be inserted into an OBD port of a vehicle to communicate with the CAN bus 108 of the vehicle (however, the diagnostics tool 110 may also be a non-portable device that is integrated into the vehicle 102). OBD, and more recently, OBD-II, may be a standard protocol used across different types of vehicles to obtain vehicle diagnostic information from a vehicle, such as status information and Diagnostic Trouble Codes (DTCs). Such diagnostic information may be obtained using established OBD parameter IDs (PIDs), which may be codes that are associated with various vehicle systems. For example, one specific PID may be used to obtain information about a throttle position of the vehicle, and another PID may be used to obtain information about the output of a specific oxygen sensor within the vehicle. Vehicles may have an OBD port in which a user may insert the diagnostics tool 110 to allow the user to capture this diagnostics data from the OBD system of the vehicle and view this data externally. Additionally, it is standard for vehicles to implement OBD-II through a CAN bus of a vehicle (for example, CAN bus 108 of vehicle 102) based on ISO 15765-4.

In some embodiments, the controller 104 may be a computing element that is in communication with any of the communication networks of the vehicle 102. For example, the controller 104 may be in communication with both the CAN bus 108 and the Ethernet network 106 (or any other type and/or number of different types of communication networks) of the vehicle 102 and may serve as an interface between the CAN bus 108 and the Ethernet network 106. The controller 104 may also serve as an interface between the diagnostics tool 110, which may only be configured to communicate with the CAN bus 108, and the Ethernet network 106. The controller 104 may be configured to perform any of the operations described herein, such as the operations described with respect to FIG. 2 below. That is, the controller 104 may be configured to receive one or more diagnostic queries from the diagnostics tool 110 through the CAN bus 108, and, based on the one or more queries received over the CAN bus 108, obtain data from the one or more devices included within the Ethernet network 106. The controller 104 may then provide the data back to the diagnostics tool 110 through the CAN bus 108. Additionally, since the CAN bus 108 and Ethernet network 106 may operate using different communication protocols, the controller 104 may be responsible for converting queries send over the CAN bus 108 into a format suitable for transmission over the Ethernet network 106. As one example, a user may insert an OBD-II device into an OBD-II port of the vehicle 102. The OBD-II device may query the vehicle 102 for data from any number of devices included within the vehicle 102. This query, as described above, may be transmitted over the CAN bus 108 of the vehicle 102, and may be received by the controller 104. Since the query was send by the OBD-II in conformity with the CAN bus 108 protocol, the components that are connected through the Ethernet network 106 (for example, the LIDAR sensor, RADAR sensor, and/or the camera) may not receive the query and/or may not receive the query in a format that may allow them to provide data being requested by the OBD-II device. The controller 104 may then translate (the terms "translate" and "convert" may be used interchangeably herein) the request from a format suitable for the CAN bus 108 to a format suitable for the Ethernet network 106, and may query the sensor on the Ethernet network 106 for the data requested by the OBD-II device over the CAN bus network 106. The use of the controller 104 in this manner may remove the need for multiple diagnostics devices to be used to obtain data from devices that may be included within different communication networks of the vehicle.

In some embodiments, the controller 104 may also be capable of storing information about the different devices on any of the communication networks of the vehicle. For example, the controller 104 may store information about some or all of the devices that are in communication with the Ethernet network 106, and may also store information associated with the devices, such as the types of data that they capture and the types of queries the devices are capable of responding to, among other types of information. Thus, the controller 104 may use this information to determine which devices to request information from and what types of information to request when a query is received by the diagnostics tool 110 over the CAN bus 108. The controller 104 may also serve as a filter for information being output by the devices on the Ethernet network 106 (or any other communications network). That is, the devices on the Ethernet network 106 may be constantly outputting data without filtering which data is being output (for example, a continuous stream of data). In such cases, the controller 104 may only provide data to the diagnostics tool 110 upon request for such information from the diagnostics tool 110. The controller 104 may also only provide a certain portion of the information based on the type of request that is being made by the diagnostics tool 110. For example, some of the information from the devices on the Ethernet network 106 may be captured by the controller 104 and provided to the diagnostics tool 110, and some of the information may be ignored by the controller 104 or stored for later access.

In some embodiments, the controller 104 may include at least one processor 118 that executes instructions that are stored in one or more memory devices (referred to as memory 119). The instructions can be, for instance, instructions for implementing functionality described as being carried out by one or more modules and systems disclosed above or instructions for implementing one or more of the methods disclosed above. The controller 104 also can include mass storage 119 that is accessible by the processor(s) 118. The mass storage 119 can include machine-accessible instructions (e.g., computer-readable instructions and/or computer-executable instructions). In some embodiments, the machine-accessible instructions may be encoded in the mass storage 119 and can be arranged in components that can be built (e.g., linked and compiled) and retained in computer-executable form in the mass storage 119 or in one or more other machine-accessible non-transitory storage media included in the controller 104. Such components can embody, or can constitute, one or many of the various modules disclosed herein. Such modules may be illustrated as translation modules 120. Additionally, the controller 104 may be a standalone device in communication with the different communication networks of the vehicle, or may also be incorporated into any of the existing vehicle elements. For example, the controller 104 may be implemented into a vehicle sensor, a vehicle ECU, or any other vehicle component as well. That is, the controller does not necessarily need to be embodied in a standalone hardware device.

Figure 2:
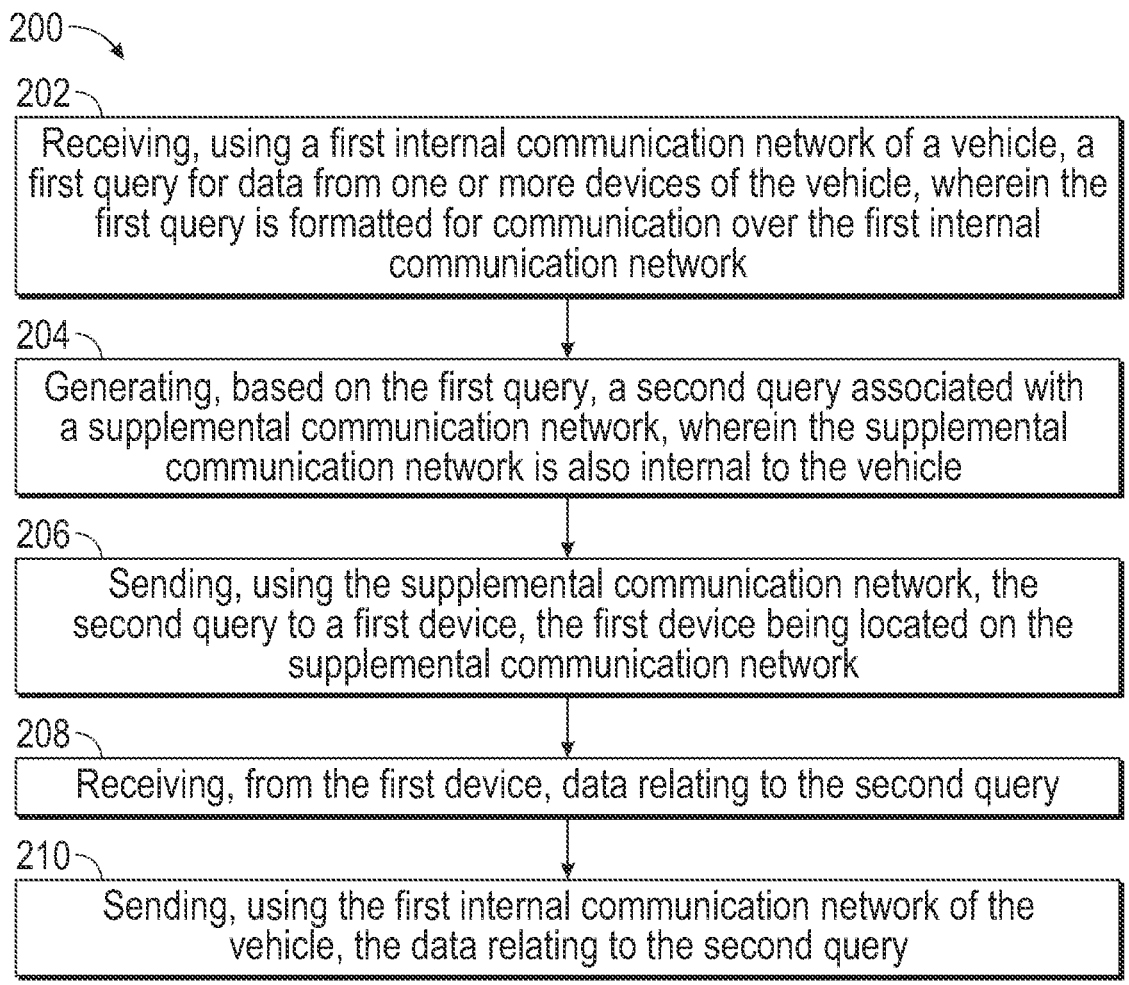
FIG. 2 depicts a schematic illustration of an example method, in accordance with one or more example embodiments of the disclosure.

FIG. 2 is an example method 200 in accordance with one or more example embodiments of the disclosure. At block 202 of the method 200 in FIG. 2, the method may include receiving, using a first internal communication network of a vehicle, a first query for data from one or more devices of the vehicle, wherein the first query is formatted for communication over the first internal communication network. In some embodiments, the first type of communication network and the second type of communication network may include different types of communication networks on which particular devices of the vehicle may be able to communicate. For example, the first type of communication network may include a CAN bus of the vehicle and the second type of communication network may include an Ethernet network. A CAN bus may be a standardized type of internal vehicle network that may be commonly found in vehicles, and may allow various devices and microcontrollers to be connected and to communicate using a standardized CAN protocol (which may be defined in the CAN specification (ISO 11898)). For example, the CAN bus may be used to transfer data between one or more Electronic Control Units (ECUs) of the vehicle that may be used to control various types of vehicle components, and/or any other types of devices included within the vehicle. In addition to the CAN bus, some vehicles my also employ an Ethernet network that may be separate from the CAN bus and may be used by certain devices within the vehicle to communicate with one another. Ethernet may be able to transport data at a much faster rate than the CAN bus (for example, up to 100 times faster or more). Thus, the Ethernet network can be used in much the same way as a CAN bus while providing much more bandwidth. This may make the Ethernet network beneficial to use for certain types of sensors and/or computing components within the vehicle, such as sensors and/or computing elements associated with autonomous or semi-autonomous vehicle functionality. It should be noted that while some of the description provided herein may refer to a CAN bus and an Ethernet network, the systems and methods described herein may similarly be applicable to any other types and/or combinations of vehicle networks as well.

In some embodiments, the first query may include a request sent from a diagnostics device over the first type of communication network. That is, the diagnostics device may be a device that is removable or permanently in communication with the first type of communication network and may be used to obtain data from the various devices on the first type of communication network. As one non-limiting example, the diagnostics device, may be an OBD-II device that may be inserted into an OBD-II port of the vehicle. Continuing this example, the OBD-II device may be configured to communicate over a CAN bus of the vehicle, which may be representative of the first type of communication network in this specific example. However, a problem may arise if the OBD-II sensor (or any other type of diagnostics tool) is configured to communicate over the first type of communication network, but it is also desired to obtain data from one or more devices on the second type of communication network. In such situations, multiple diagnostics tools may be required to separately obtain data from the first type of communication network and the second type of communication network. For example, a user may need to connect an OBD-II tool to obtain data from devices connected over the CAN bus, and may need to use an Ethernet connection to obtain data from devices connected to the Ethernet network of the vehicle (in the particular example in which the first type of communication network is a CAN bus and the second type of communication network is an Ethernet network). The systems and methods described herein may remedy this problem, as my be described below, through the use of an intermediary device (for example, a controller, such as the controller 104) that may be used to coordinate communications with multiple types of communication networks in the vehicle based on a request from the diagnostics tool formatted for a single type of communication network in the vehicle.

In some embodiments, the request associated with the first query may include a request for any number of types and/or combinations of data from some or all of the devices connected to any number of types and/or combination of communication networks within the vehicle. In some cases, the request may also be a generalized request for data from some or all of the devices within the vehicle. That is, the request may not necessarily be directed to a specific type of communication network, or a specific device within a specific type of communication network, but may rather simply be a request for general information from the vehicle. As a first example, the request may include a request for general status information for some or all of the devices within the vehicle. For example, the request may include a request to determine which of the devices of the vehicle are currently active and in use. Similarly, the request may include a request for performance data of some or all of the devices within the vehicle. The performance data may pertain to any number of facets of the functionality of such devices. For example, the performance data may pertain to the communications being sent from and received by a given device on a communication network, such as a packet rate from a device, an error rate of packet transmission from the device, among other types of network performance data. The performance data may also pertain to the performance of the device itself, such as the data that is being generated by the device, which may provide an indication if the device is correctly functioning, or if the device is experiencing a malfunction, for example. The performance data may also include any other types of data associated with the device and how it may function itself and with respect to other devices within the vehicle.

As a second example, the request may be a generalized request for all fault codes that may have been identified and stored by the vehicle. The controller and/or any other device (for example, an ECU) within the vehicle may be monitoring in real time, or periodically, data from one or more devices within the vehicle. The controller and/or any other device performing the monitoring may be able to determine if any of the devices within the vehicle are malfunctioning based on this data. If it is determined that a device is malfunctioning, then a fault code may be stored indicating the malfunction. If a device other than the controller identifies the fault, then the fault code may be provided by that device to the controller for storage. However, in some cases, the device may store the fault code locally and the controller may request the fault code from the device. In some cases, the individual devices themselves may be able to monitor themselves (monitor their own data) and produce their own fault code based on a malfunction that they identify in themselves. This fault code may then be provided to the controller for storage. In some cases, if however, the individual devices may also store their own fault codes locally, such that they may be provided to the controller upon request. When the controller receives a general request for any fault codes associated with any of the devices within the vehicle, the controller may take various actions depending on where fault codes may be stored. For example, if the fault codes are stored at the controller itself, the controller may simply provide the fault codes to the diagnostics tool over the CAN bus. However, if the fault codes are stored on any other devices within the vehicle, then the controller may translate the request formatted in accordance with a CAN bus protocol into a format that may then be used to obtain data from devices on other types of vehicle networks, such as the Ethernet network. The diagnostics tool may not necessarily specifically request data from a device on a vehicle network other than the CAN bus, but the controller may be able to determine that the request may require data from devices on one or more of these other vehicle networks, and may then translate the request accordingly. Additionally, in some cases, fault codes associated with only specific devices may be requested as well, rather than a general request for any fault codes identified with any devices.

In some embodiments, the request may also be more specifically directed to some or all of the devices on a specific type of communication network, or may be directed to a specific individual device or devices. For example, the request may include a request for data from some or all of the devices connected to an Ethernet network of the vehicle. As another example, the request may include a request for data from a LIDAR sensor or a RADAR sensor of the vehicle. In some embodiments, the request may not be directed to a specific device or devices, but may be directed to a specific type of information. For example, the request may be for all data pertaining to detected distances of objects nearby the vehicle over a given period of time. The diagnostics tool may not necessarily know which particular device to request this data from, but the controller may receive this request and identify an appropriate device and/or devices on a given type of communication network to request the data from. Continuing with the example of the data pertaining to detected distances of objects, the controller may determine that this data may be obtained from a LIDAR sensor of the vehicle. The controller may then translate the request into a format suitable for a type of communication network that the LIDAR sensor is connected to, transmit the request to the LIDAR sensor, and provide the received data back to the diagnostics tool. For example, the LIDAR sensor may be connected to the Ethernet network, and the controller may translate the request from a format suitable for the CAN bus to a format suitable for the Ethernet network.

Block 204 of the method 200 may include generating, based on the first query, a second query associated with a supplemental communication network, wherein the supplemental communication network is also internal to the vehicle. In some embodiments, determining the second query associated with the second type of communication network may refer to translating the first query formatted for communication over the first type of communication network into a format suitable for communication over the second type of communication network. For example, the first query may be formatted from transmission over the CAN bus of the vehicle, and the second query may be converted into a format for transmission over an Ethernet network of the vehicle. Thus, in these embodiments, the first query and the second query may both be queries for the same data, but may be formatted for communication over different types of vehicle networks. Additionally, in some embodiments, the first query being associated with a CAN bus of the vehicle and the second query being associated with an Ethernet network of the vehicle may simply be examples of types of communication networks that these queries may be associated with. Either the first query and/or the second query may also be formatted for communication over any other type of network that may be included within the vehicle as well. That is, the controller may not necessarily be limited to only translating queries formatted for communication over a CAN bus to queries formatted for communication over an Ethernet network.

In some embodiments, the second query may alternatively be different than the first query. In such cases, determining the second query may not involve simply converting the first query into a format suitable for transmission on the second type of communication network, but may rather involve establishing a new query based on the types of data being requested by the first query. This may be the case when the first query is a more generalized query from the diagnostics tool rather than a query directed to a specific device or devices. For example, the diagnostics tool may send a first request to the controller over a first communications network for performance data from all devices within the vehicle. The vehicle may then identify all of the different devices on all of the communication networks of the vehicle, determine what performance data may be obtained from individual devices, and may generate requests to send to the individual devices asking for particular types of performance data that the devices may be capable of providing. This is merely an example, and the second query may differ from the first query in any number of other ways as well.

Block 206 of the method 200 may include sending, using the supplemental communication network, the second query to a first device, the first device being located on the supplemental communication network. In some embodiments, the first device may be a specific device that data is requested from in the first query made by the diagnostics tool. However, in some cases, if a more generalized request for data is made, or if data is requested from multiple devices within the vehicle, then the second request may also be sent to any other number of devices as well.

Block 208 of the method 200 may include receiving, from the first device, data relating to the second query. In some embodiments, the data may include the data that is requested through the first query. For example, data that may be requested using the diagnostics tool over the CAN bus of the vehicle.

Block 210 of the method 200 may include sending, using the first internal communication network of the vehicle, the data relating to the second query. In some embodiments, sending the data relating to the second query over the first type of communication network may refer to the controller providing the data it obtained from the one or more devices within the vehicle back to the diagnostics tool in accordance with the first request of the diagnostics tool. Sending the data back to the diagnostics tool may also involve the controller converting the data into a format suitable for transmission over the first type of communication network or otherwise packaging the data in a format suitable for transmission over the first type of communication network. For example, the data may be formatted or packaged to transmit over a CAN bus in which the diagnostics tool is in communication with. For example, the data may be packaged in a CAN frame or packet, which may include standardized headers used to facilitate the transmission of the data over the CAN bus back to the diagnostics tool.

The operations described and depicted in the illustrative process flow of FIG. 2 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 2 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Figure 3:
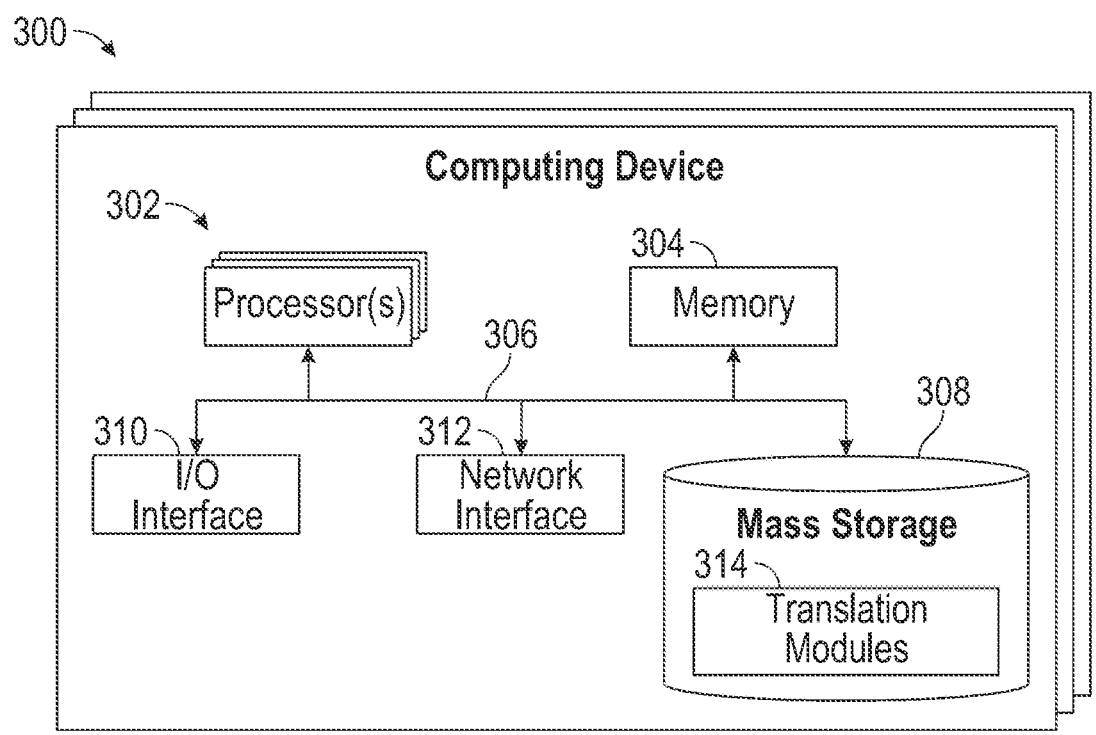
FIG. 3 depicts a schematic illustration of an example computing device architecture, in accordance with one or more example embodiments of the disclosure.

FIG. 3 illustrates an example computing device 300, in accordance with one or more embodiments of this disclosure. The computing device 300 may be a device used to perform any of the operations described herein. For example, the computing device 300 may be representative of the controller 104 described with respect to FIG. 1, or any other controller described herein. The computing device 300 may include at least one processor 302 that executes instructions that are stored in one or more memory devices (referred to as memory 304). The instructions can be, for instance, instructions for implementing functionality described as being carried out by one or more modules and systems disclosed above or instructions for implementing one or more of the methods disclosed above. The processor(s) 302 can be embodied in, for example, a CPU, multiple CPUs, a GPU, multiple GPUs, a TPU, multiple TPUs, a multi-core processor, a combination thereof, and the like. In some embodiments, the processor(s) 302 can be arranged in a single processing device. In other embodiments, the processor(s) 302 can be distributed across two or more processing devices (e.g., multiple CPUs; multiple GPUs; a combination thereof; or the like). A processor can be implemented as a combination of processing circuitry or computing processing units (such as CPUs, GPUs, or a combination of both). Therefore, for the sake of illustration, a processor can refer to a single-core processor; a single processor with software multithread execution capability; a multi-core processor; a multi-core processor with software multithread execution capability; a multi-core processor with hardware multithread technology; a parallel processing (or computing) platform; and parallel computing platforms with distributed shared memory. Additionally, or as another example, a processor can refer to an integrated circuit (IC), an ASIC, a digital signal processor (DSP), a FPGA, a PLC, a complex programmable logic device (CPLD), a discrete gate or transistor logic, discrete hardware components, or any combination thereof designed or otherwise configured (e.g., manufactured) to perform the functions described herein.

The processor(s) 302 can access the memory 304 by means of a communication architecture 306 (e.g., a system bus). The communication architecture 306 may be suitable for the particular arrangement (localized or distributed) and type of the processor(s) 302. In some embodiments, the communication architecture 306 can include one or many bus architectures, such as a memory bus or a memory controller; a peripheral bus; an accelerated graphics port; a processor or local bus; a combination thereof; or the like. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and or the like.

Memory components or memory devices disclosed herein can be embodied in either volatile memory or non-volatile memory or can include both volatile and non-volatile memory. In addition, the memory components or memory devices can be removable or non-removable, and/or internal or external to a computing device or component. Examples of various types of non-transitory storage media can include hard-disc drives, zip drives, CD-ROMs, digital versatile discs (DVDs) or other optical storage, magnetic cassettes, magnetic tape, magnetic disk storage or other magnetic storage devices, flash memory cards or other types of memory cards, cartridges, or any other non-transitory media suitable to retain the desired information and which can be accessed by a computing device.

As an illustration, non-volatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory.

In addition to storing executable instructions, the memory 304 also can retain data, such as any ledger 156 information, among other data.

Each computing device 300 also can include mass storage 308 that is accessible by the processor(s) 302 by means of the communication architecture 306. The mass storage 308 can include machine-accessible instructions (e.g., computer-readable instructions and/or computer-executable instructions). In some embodiments, the machine-accessible instructions may be encoded in the mass storage 308 and can be arranged in components that can be built (e.g., linked and compiled) and retained in computer-executable form in the mass storage 308 or in one or more other machine-accessible non-transitory storage media included in the computing device 300. Such components can embody, or can constitute, one or many of the various modules disclosed herein. Such modules are illustrated as translation modules 314 (which may be the same as translation modules 120).

Execution of the translations modules 314, individually or in combination, by at least one of the processor(s) 302, can cause the computing device 300 to perform any of the operations described herein (for example, the operations described with respect to FIG. 2, as well as any other operations).

Each computing device 300 also can include one or more input/output interface devices 310 (referred to as I/O interface 310) that can permit or otherwise facilitate external devices to communicate with the computing device 300. For instance, the I/O interface 310 may be used to receive and send data and/or instructions from and to an external computing device. The computing device 300 also includes one or more network interface devices 312 (referred to as network interface(s) 312) that can permit or otherwise facilitate functionally coupling the computing device 300 with one or more external devices. Functionally coupling the computing device 300 to an external device can include establishing a wireline connection or a wireless connection between the computing device 300 and the external device. The network interface devices 312 can include one or many antennas and a communication processing device that can permit wireless communication between a vehicle and either another vehicle or an external device. The other vehicle can be, for example, one of the vehicles included in the network 110 or an out-of-network vehicle. The external device can be, for example, one of the mobile devices included in the network 110. Such a communication processing device can process data according to defined protocols of one or several radio technologies. The radio technologies can include, for example, 3G, Long Term Evolution (LTE), LTE-Advanced, 5G, IEEE 802.11, IEEE 802.16, Bluetooth, ZigBee, near-field communication (NFC), and the like.

In some embodiments, the computing device 300 may be in communication with an imaging device 316 (for example, through the I/O interface 310 of the computing device as shown in FIG. 3). The imaging device 316 may be the same as any of the imaging devices described herein (for example, an imaging device for which a flare artifact score is determined based on one or more images that the imaging device captures).

As used in this application, the terms "environment," "system," "unit," "module," "architecture," "interface," "component," and the like refer to a computer-related entity or an entity related to an operational apparatus with one or more defined functionalities. The terms "environment," "system," "module," "component," "architecture," "interface," and "unit," can be utilized interchangeably and can be generically referred to functional elements. Such entities may be either hardware, a combination of hardware and software, software, or software in execution. As an example, a module can be embodied in a process running on a processor, a processor, an object, an executable portion of software, a thread of execution, a program, and/or a computing device. As another example, both a software application executing on a computing device and the computing device can embody a module. As yet another example, one or more modules may reside within a process and/or thread of execution. A module may be localized on one computing device or distributed between two or more computing devices. As is disclosed herein, a module can execute from various computer-readable non-transitory storage media having various data structures stored thereon. Modules can communicate via local and/or remote processes in accordance, for example, with a signal (either analogic or digital) having one or more data packets (e.g., data from one component interacting with another component in a local system, distributed system, and/or across a network such as a wide area network with other systems via the signal).

As yet another example, a module can be embodied in or can include an apparatus with a defined functionality provided by mechanical parts operated by electric or electronic circuitry that is controlled by a software application or firmware application executed by a processor. Such a processor can be internal or external to the apparatus and can execute at least part of the software or firmware application. Still in another example, a module can be embodied in or can include an apparatus that provides defined functionality through electronic components without mechanical parts. The electronic components can include a processor to execute software or firmware that permits or otherwise facilitates, at least in part, the functionality of the electronic components.

In some embodiments, modules can communicate via local and/or remote processes in accordance, for example, with a signal (either analog or digital) having one or more data packets (e.g., data from one component interacting with another component in a local system, distributed system, and/or across a network such as a wide area network with other systems via the signal). In addition, or in other embodiments, modules can communicate or otherwise be coupled via thermal, mechanical, electrical, and/or electro-mechanical coupling mechanisms (such as conduits, connectors, combinations thereof, or the like). An interface can include input/output (I/O) components as well as associated processors, applications, and/or other programming components.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, permit the automated provision of an update for a vehicle profile package. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

The invention claimed is:

1. A vehicle comprising:
 a processor; and
 a memory storing computer-executable instructions that, when executed by the processor, cause the processor to:
  receive, over a Controller Area Network (CAN) bus of the vehicle, a first query from a diagnostic tool in communication with the CAN bus, wherein the first query comprises a generalized request for data from devices within the vehicle;

identify a plurality of devices that are in communication with a supplemental network of the vehicle;
determine one or more types of available data from the plurality of devices;
generate a second query by creating a second request for data according to the one or more types of available data and packaging the second request for data in a format suitable for transmission over the supplemental communication network;
send, using the supplemental communication network, the second query to the plurality of devices;
receive, using the supplemental communication network, data relating to the second query from the plurality of devices; and
send, using the CAN bus, the data relating to the second query to the diagnostic tool.

2. The vehicle of claim 1, wherein the diagnostic tool further comprises an on-board diagnostics (OBD) device.

3. The vehicle of claim 1, wherein the one or more types of available data from the plurality of devices further comprise at least one of: status data, performance data, and one or more fault codes.

4. The vehicle of claim 1, wherein send, using the CAN bus, the data relating to the second query further comprises translating the data relating to the second query into a format suitable for transmission over the CAN bus.

5. The vehicle of claim 1, wherein the computer-executable instructions further cause the processor to:
store information associated with the devices within the vehicle, wherein the information associated with the devices comprises types of data that the devices capture and types of queries the devices are capable of responding to.

6. The vehicle of claim 1, wherein the supplemental communication network is one of: an Ethernet network, a FlexRay network, or a Local Interconnected Network (LIN).

7. The vehicle of claim 1, wherein the plurality of devices comprises one or more of: a Light Detection and Ranging (LIDAR) sensor, a Radio Detection and Ranging (RADAR) sensor, or a camera.

8. A method comprising:
receiving, over a first internal communication network of a vehicle, a first query from a diagnostic tool in communication with the first internal communication network, wherein the first query comprises a generalized request for data from devices within the vehicle;
identifying a plurality of devices that are in communication with a supplemental network of the vehicle, wherein the supplemental communication network is also internal to the vehicle;
determining one or more types of available data from the plurality of devices;
generating a second query by creating a second request for data according to the one or more types of available data and packaging the second request for data in a format suitable for transmission over the supplemental communication network;
sending, using the supplemental communication network, the second query to the plurality of devices;
receiving, using the supplemental communication network, data relating to the second query from the plurality of devices; and
sending, using the CAN bus, the data relating to the second query to the diagnostic tool.

9. The method of claim 8, wherein the diagnostic tool further comprises an on-board diagnostics (OBD) device.

10. The method of claim 8, wherein the one or more types of available data from the first device further comprises at least one of: status data, performance data, and one or more fault codes.

11. The method of claim 8, wherein sending, using the first internal communication network of a vehicle, the data relating to the second query further comprises translating the data relating to the second query into a format suitable for transmission over the first internal communication network of a vehicle.

12. The method of claim 8, further comprising:
storing information associated with the devices within the vehicle, wherein the information associated with the devices comprises types of data that the devices capture and types of queries the devices are capable of responding to.

13. The method of claim 8, wherein the supplemental communication network is one of: an Ethernet network, a FlexRay network, or a Local Interconnected Network (LIN).

14. The method of claim 8, wherein the plurality of devices comprises one or more of: a Light Detection and Ranging (LIDAR) sensor, a Radio Detection and Ranging (RADAR) sensor, or a camera.

15. A non-transitory computer readable medium including computer-executable instructions stored thereon which, when executed by one or more processors of a wireless access point, cause the one or more processors to perform operations of:
receiving, over a Controller Area Network (CAN) bus of the vehicle, a first query from an On-Board Diagnostics (OBD) device in communication with the CAN bus, wherein the first query comprises a generalized request for data from devices within the vehicle;
identifying a plurality of devices that are in communication with a supplemental network of the vehicle;
determining one or more types of available data from the plurality of devices;
generating a second query by creating a second request for data according to the one or more types of available data and packaging the second request for data in a format suitable for transmission over the supplemental communication network;
sending, using the supplemental communication network, the second query to the plurality of devices;
receiving, using the supplemental communication network, data relating to the second query from the plurality of devices; and
sending, using the CAN bus, the data relating to the second query to the OBD device.

16. The non-transitory computer readable medium of claim 15, wherein the one or more types of available data from the first device further comprises at least one of: status data, performance data, and one or more fault codes.

17. The non-transitory computer readable medium of claim 15, wherein the one or more types of available data from the first device further comprises at least one of: status data, performance data, and one or more fault codes.

18. The non-transitory computer readable medium of claim 15, the operations further comprising:
storing information associated with the devices within the vehicle, wherein the information associated with the devices comprises types of data that the devices capture and types of queries the devices are capable of responding to.

19. The non-transitory computer readable medium of claim 15, wherein the supplemental communication network is one of: an Ethernet network, a FlexRay network, or a Local Interconnected Network (LIN).

20. The non-transitory computer readable medium of claim 15, wherein the plurality of devices comprises one or more of: a Light Detection and Ranging (LIDAR) sensor, a Radio Detection and Ranging (RADAR) sensor, or a camera.

\* \* \* \* \*